(No Model.)

A. J. MOXHAM.
TUNNEL.

No. 558,094. Patented Apr. 14, 1896.

6 Sheets—Sheet 3.

WITNESSES:
H. E. Ford
E. M. Bolsinger

INVENTOR
Arthur J. Moxham
BY
Ward Raymond
ATTORNEY.

(No Model.) 6 Sheets—Sheet 4.
A. J. MOXHAM.
TUNNEL.
No. 558,094. Patented Apr. 14, 1896.
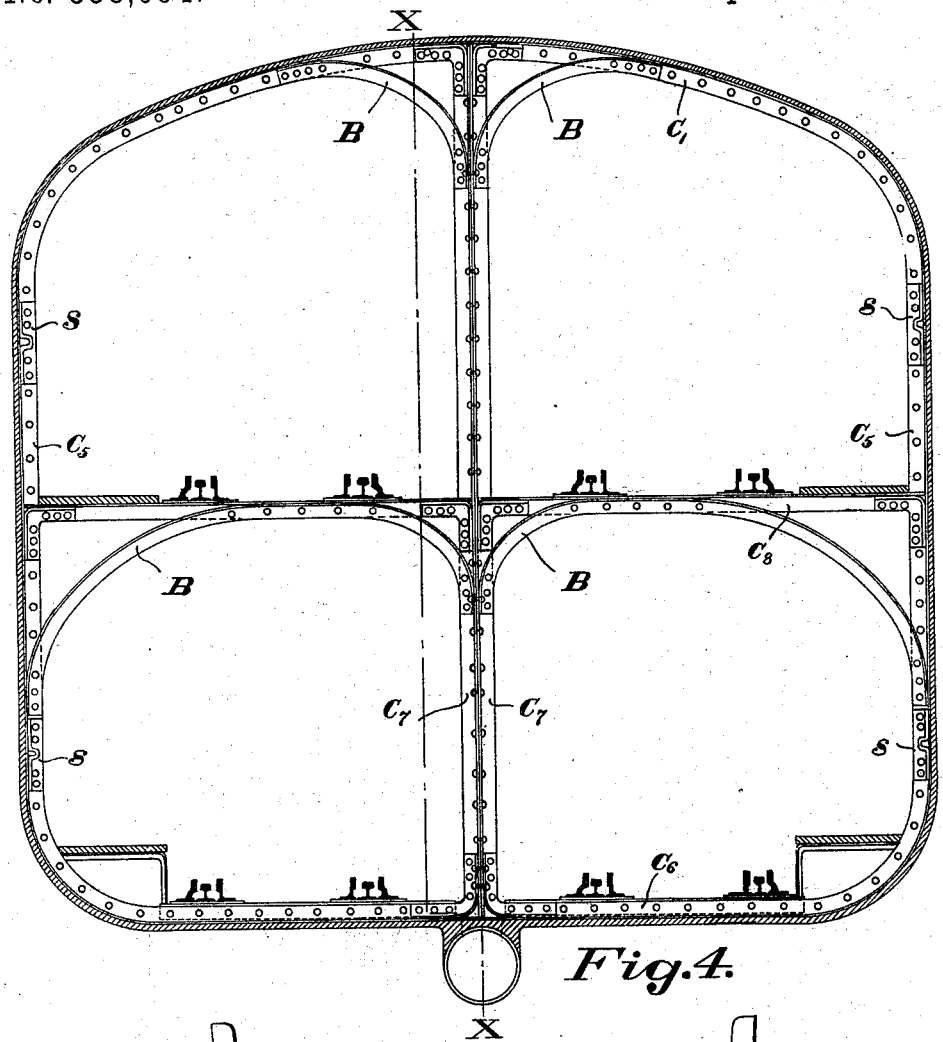
Fig. 4.
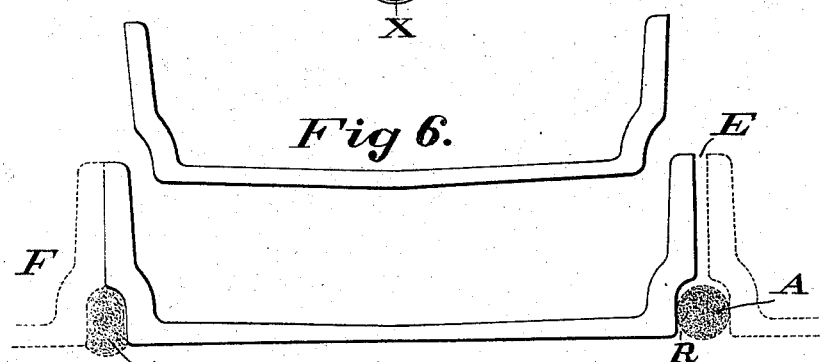
Fig. 6.
Fig. 5.
WITNESSES:
Hamilton E. Ford
E. M. Bolsinger
INVENTOR
Arthur J. Moxham
BY
Ward Raymond
ATTORNEY.

(No Model.)  
6 Sheets—Sheet 5.

A. J. MOXHAM.
TUNNEL.

No. 558,094. Patented Apr. 14, 1896.

WITNESSES:  
Hamilton E. Ford  
E. M. Bolsinger

INVENTOR  
Arthur J. Moxham  
BY  
Ward Raymond  
ATTORNEY.

(No Model.) 6 Sheets—Sheet 6.

A. J. MOXHAM.
TUNNEL.

No. 558,094. Patented Apr. 14, 1896.

WITNESSES:
Hamilton E. Ford
E. M. Bolsinger

INVENTOR
Arthur J. Moxham
BY
Ward Raymond
ATTORNEY.

UNITED STATES PATENT OFFICE.

ARTHUR J. MOXHAM, OF JOHNSTOWN, PENNSYLVANIA.

TUNNEL.

SPECIFICATION forming part of Letters Patent No. 558,094, dated April 14, 1896.

Application filed June 2, 1894. Serial No. 513,278. (No model.)

*To all whom it may concern:*

Be it known that I, ARTHUR J. MOXHAM, of Johnstown, county of Cambria, State of Pennsylvania, have invented a new and useful Improvement in Tunnels, of which the following specification is a true and exact description, due reference being had to the accompanying drawings.

My invention (Case No. 41) relates specially to tunnels used for railway purposes, and has for its object to provide a tunnel having several novel features hereinafter described.

In general a tunnel constructed in accordance with my invention is made of a series of rings or sections of rolled-steel shapes riveted together, and when the tunnel is constructed having more than one compartment these shapes also form cross struts or braces, as will be described.

Figure 1:
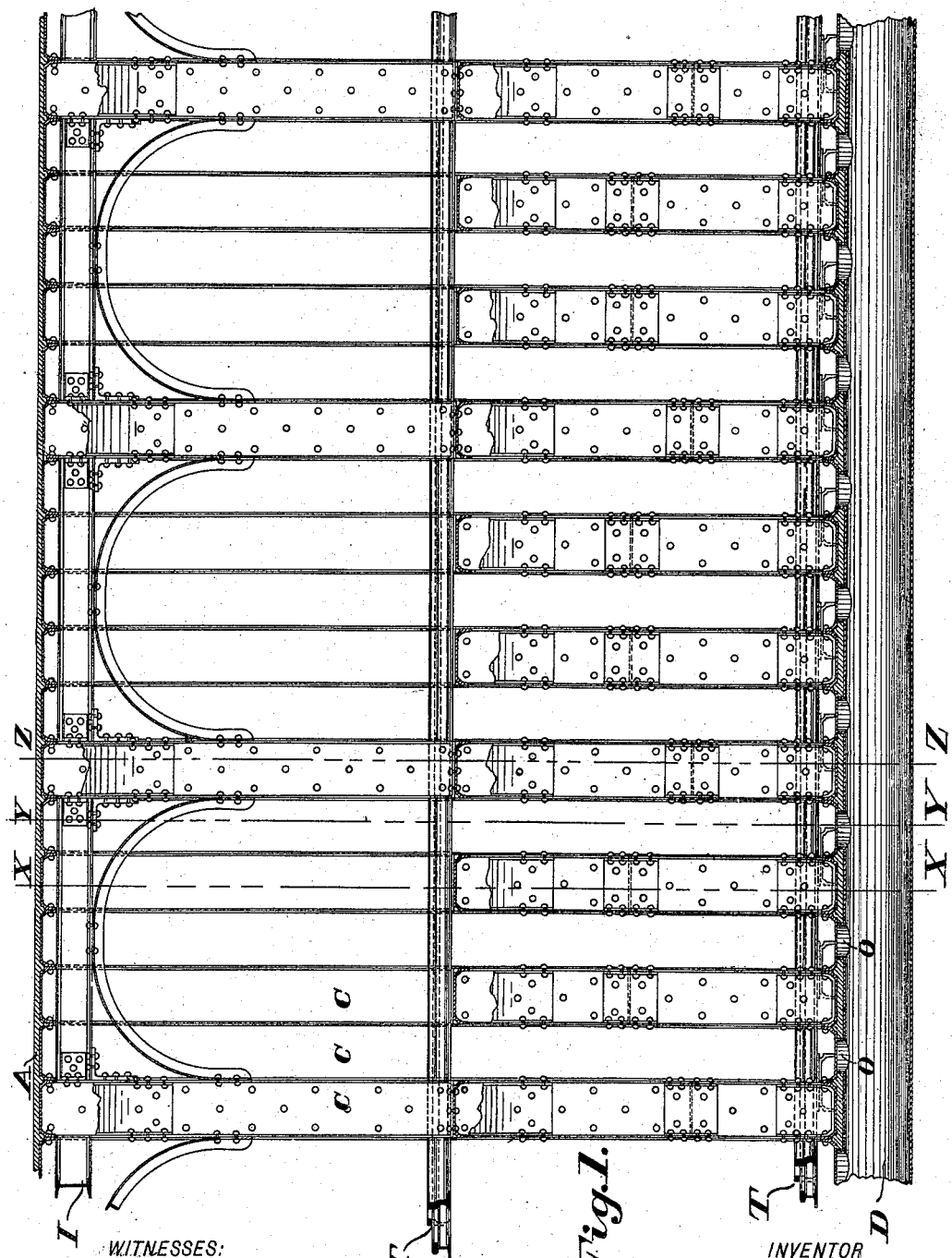
Figure 2:
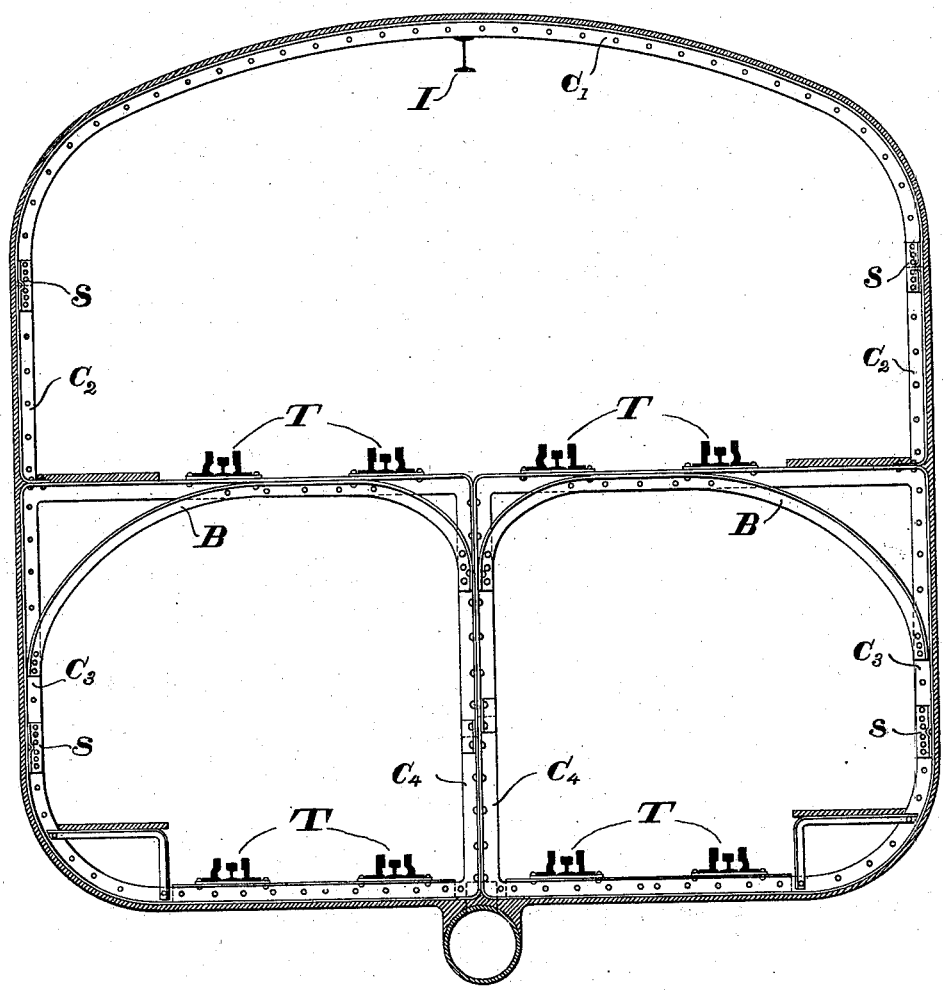
Figure 7:
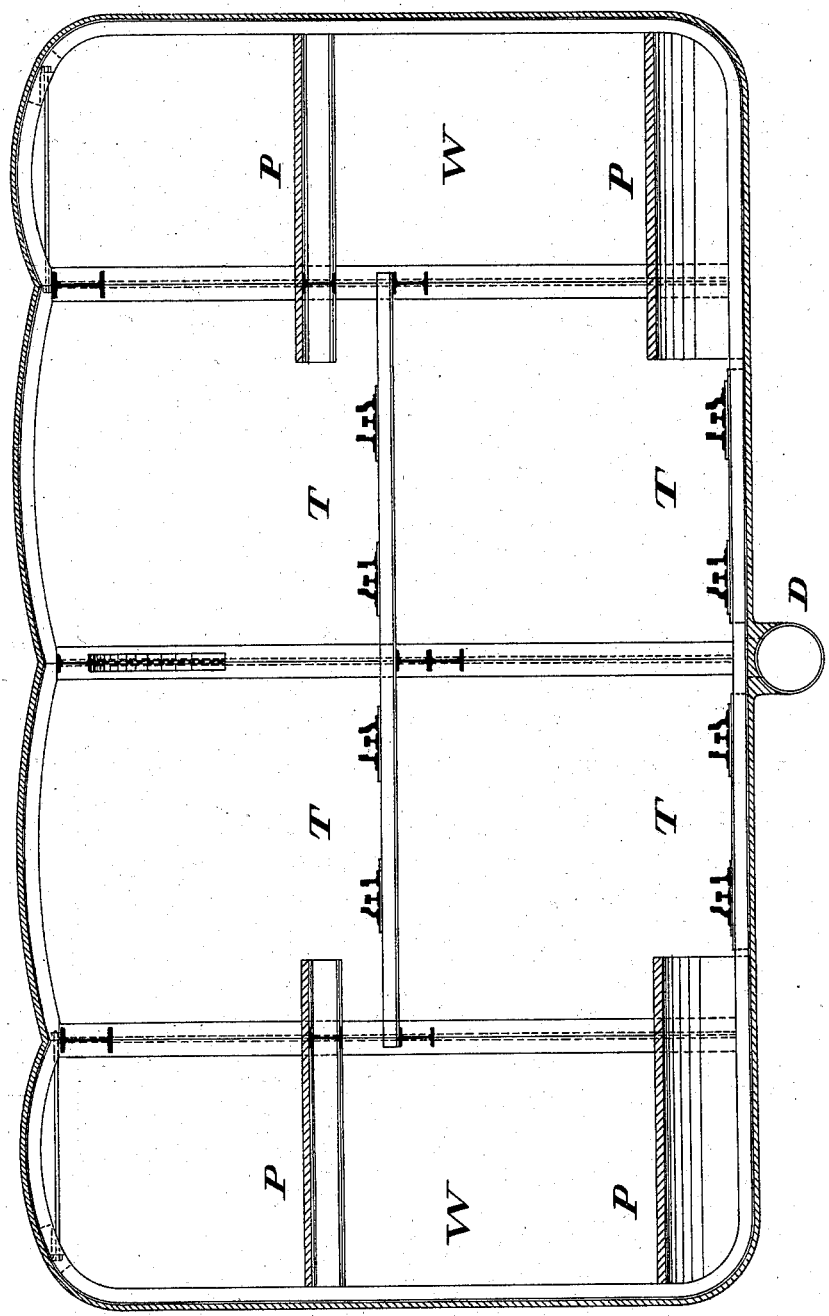
Figure 8:
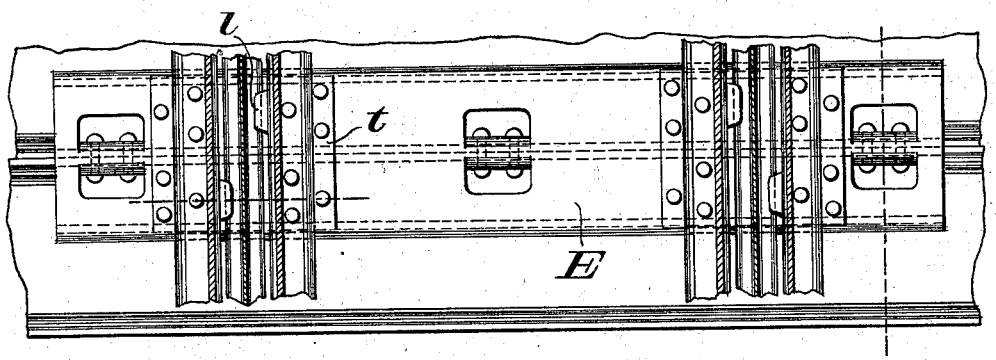
Figure 9:
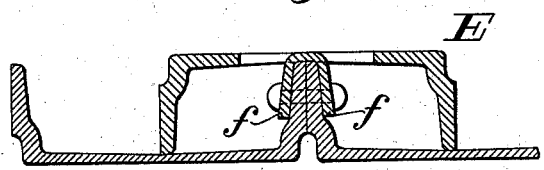
Figure 10:
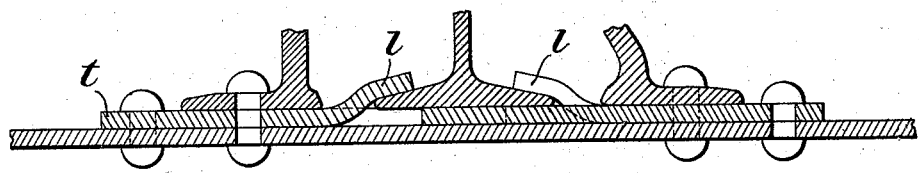
Figure 11:
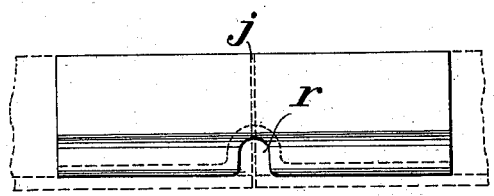
Figure 12:
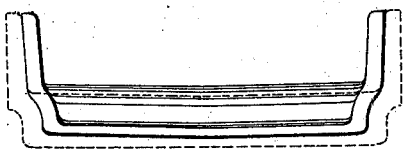

Referring to the drawings, Figure 1 represents a longitudinal vertical section of a four-track tunnel on a line a little one side of the center line X X of Fig. 4. Fig. 2 is a cross-section on line X X, Fig. 3 a section on line Y Y, and Fig. 4 a section on line Z Z, all of Fig. 1. Fig. 5 is a section of the shape or channel of which the tunnel is made, and Fig. 6 shows a splicing member for the same. Fig. 7 shows a cross-section through a station on the line. Figs. 8, 9, and 10 illustrate the method of securing the track-rails in place. Figs. 11 and 12 show a device for effecting water-tight joints between members of the shell.

I will now describe the construction of a tunnel as shown in the drawings.

This tunnel is built almost entirely of the channel-beams shown in Fig. 5. It forms the shell of the tunnel, the cross-braces, ties for the support of the rails, and floor-support for the compartments.

Figure 3:
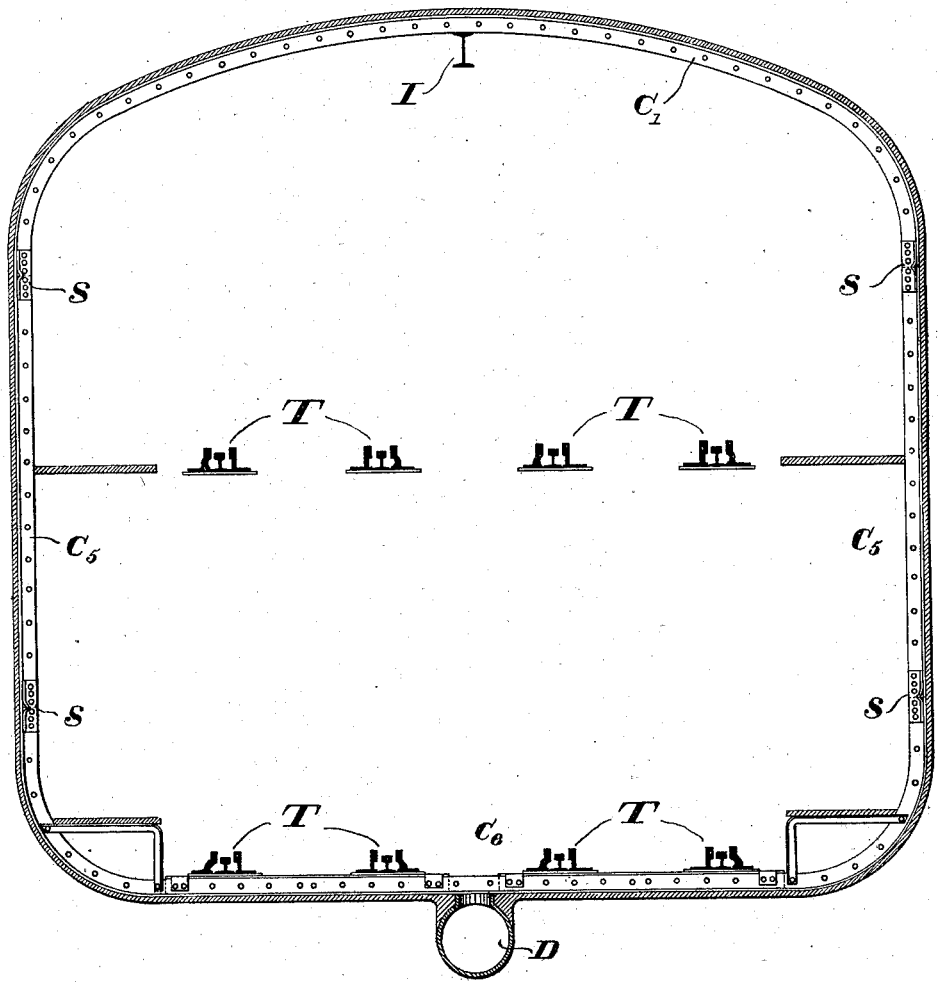

As shown in Fig. 1, there are three different constructions of the sections in the tunnel—viz., sections X, Y, and Z, or Figs. 2, 3, and 4. These are so arranged that every other section has the central cross-strut, forming the floor of the upper compartment and the supporting-post under it, while every sixth section has the central support continued up to the roof and forms a support therefor.

In Fig. 1, C is the channel forming the shell of the tunnel. T are the tracks for the cars to run upon. Between the central posts of section Z the center of the roof is supported by the beams I, secured to the posts. Below the tunnel runs the drain D, connected with the tunnel by numerous openings. Around the outside of the shell is a layer of cement A, which preserves the metal of the shell.

The various shells are constructed as follows: Shell X, Fig. 2, consists of the top or crown portion C, bent to the proper arch. To the ends of this are joined the vertical sides $C^2$ by splice-plates S. These sides $C^2$ are secured by rivets, as shown, to the lower part. Each half of the lower part is formed of the members $C^3$ and $C^4$. $C^3$ starts at the center of the middle strut and extends upward to the height of the second-story floor. Here it bends sharply and runs across, forming a member of the floor to where it joins $C^2$. Here it again bends sharply and extends downward, forming a portion of the shell, to where it meets $C^4$, which sweeps below the tracks, and forming the bottom of the tunnel to the center, where it bends upward and meets $C^3$, thus completing the center strut. The bracket-piece B serves to stiffen that piece of $C^3$ upon which the tracks rest.

In section Y, Fig. 3, there is nothing but a ring formed of the pieces $C'$, $C^5$, and $C^6$, joined by splices S.

Section Z, Fig. 4, is composed of a rim similar to Fig. 3, the vertical post $C^7$ extending from top to bottom and the cross-struts $C^8$ forming the second-story floor. As said before, the tunnel is composed of these sections alternating with each other, as shown in Fig. 1.

The brace members B and splices S are of the shape shown in Fig. 6, and fit inside the channel C between the flanges.

I render the joints between the channels water-tight in a novel way, as follows: Referring to Fig. 5, the channel C has the recess R formed in each corner, which when two channels are placed together forms a deep groove. When the channels are still standing apart, as at E, I insert in the groove a rope or strip of compressible material A, as asphalt. The channels are now drawn together, as at F, thereby pinching the strip and causing it to fill the groove, as shown at F. I apply the same idea to the joints between abutting ends of the channels where splice-plates S are used. Figs. 11 and 12 show a splice-plate S on larger scale. In the center is formed the recess or groove $r$, in which the strip of elastic material is placed, so that while the plate is drawn in position this material is compressed upon the joint J.

The drain D is practically an open gutter, so close together are the openings O which permit any moisture or leakage to flow into it.

Where stations occur it becomes necessary to widen the tunnel. This is done as shown in Fig. 7, in which P are the platforms, placed in the offsets or wings W. The shell is constructed of the channels like the main body of the tunnel, and is braced by the vertical posts, second-story floor, and platforms, as shown.

The track is secured in place as follows: Beneath the rails is the tie-plate $t$, Fig. 8. This tie-plate has the lugs $l$ engaging the base-flanges of the track-rails, and it is riveted to the guard-rails, as shown. In the upper tracks this tie-plate $t$ rests directly on the cross-channels $C^3$ and $C^8$. Thus is provided a wearing-plate for the lower flanges of the rail, and the cross-brace is saved from the wear. The two steel guard-rails are riveted or otherwise attached to the wearing-plates, though, if preferred, they can be attached directly to the cross-braces, acting as track-supports and cross-ties. The space between the rail and guards is filled with cement or other suitable material, and thus is formed a composite structure of great lateral strength, in which the center is the rail, by which means the rail can be welded or made otherwise continuous, and when so treated is restrained by the surrounding bond against the tendency to distortion that would otherwise be caused by expansion. In the lower tracks, however, this is not possible, as the flanges of the channels project upward. To afford a bearing-surface, I use the tie E, which straddles the joint, and being of the channel shape matches with it and thus distributes the load on three points, the open space being preferably filled with cement. These ties are secured in place by the flaps $f$, turned down to embrace the flanges of the shell and riveted thereto.

A tunnel built in accordance with my invention has many advantages. The rivets are all accessible, none of them passing through to the outside of the shell, but all where they can be removed or inspected. It is very stiff and rigid and capable of largely supporting itself where passing through soft or yielding ground. The cross-braces, being part of and integral with the shell, render it extremely stiff.

Having thus described my invention, what I claim, and desire to protect by Letters Patent, is—

1. In tunnel construction, as herein set forth, a member forming at the same time a portion of the shell and a cross-brace.

2. In the construction of tunnels, as herein set forth, a member, a part of which forms a portion of the shell and having an end bent inward so as to form an integral strut or brace whereby the bracing member of the tunnel is integral with the shell.

In testimony whereof I have affixed my signature in presence of two witnesses.

ARTHUR J. MOXHAM.

Witnesses:
W. McLAIN,
D. BRYAN.